(12) United States Patent
Lubenow et al.

(10) Patent No.: US 7,347,044 B1
(45) Date of Patent: Mar. 25, 2008

(54) EXHAUST WATER TRAP

(75) Inventors: Scott M. Lubenow, Fitchburg, WI (US); Patrick M. Klein, Madison, WI (US); Robert J. Schellin, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 323 days.

(21) Appl. No.: 11/142,085

(22) Filed: Jun. 1, 2005

Related U.S. Application Data

(63) Continuation-in-part of application No. 11/085,715, filed on Mar. 21, 2005, now Pat. No. 7,114,330, which is a continuation of application No. 10/376,424, filed on Feb. 28, 2003, now Pat. No. 6,868,670.

(51) Int. Cl.
*F01N 3/02* (2006.01)
*F02B 27/02* (2006.01)

(52) U.S. Cl. .................. 60/309; 60/312; 181/233

(58) Field of Classification Search .......... 60/309; 181/233
See application file for complete search history.

(56) References Cited

U.S. PATENT DOCUMENTS

| | | | |
|---|---|---|---|
| 2,446,631 A | 8/1948 | Burks | |
| 2,482,577 A | 9/1949 | Dahlstrom | |
| 2,721,619 A * | 10/1955 | Cheairs | 181/244 |
| 2,732,913 A * | 1/1956 | Higgins | 96/386 |
| 2,921,432 A | 1/1960 | Marcotte et al. | |
| 3,817,221 A | 6/1974 | Nohira et al. | |
| 4,450,934 A * | 5/1984 | Davis | 181/228 |
| 4,527,659 A | 7/1985 | Harrington | |
| 4,629,226 A | 12/1986 | Cassel et al. | |
| 5,170,020 A * | 12/1992 | Kruger et al. | 181/211 |
| 5,321,215 A * | 6/1994 | Kicinski | 181/211 |
| 5,746,630 A | 5/1998 | Ford et al. | |
| 5,808,245 A | 9/1998 | Wiese et al. | |
| 6,152,258 A | 11/2000 | Deavers et al. | |
| 6,412,595 B1 | 7/2002 | Horak et al. | |
| 6,430,921 B1 | 8/2002 | Stuart et al. | |
| 6,802,387 B1 | 10/2004 | Kreger et al. | |
| 6,868,670 B1 * | 3/2005 | Schellin | 60/309 |
| 7,114,330 B1 * | 10/2006 | Schellin | 60/309 |

FOREIGN PATENT DOCUMENTS

| | | |
|---|---|---|
| JP | 358202323 A | 11/1983 |
| JP | 411072018 | 3/1999 |

* cited by examiner

*Primary Examiner*—Thomas Denion
*Assistant Examiner*—Loren Edwards
(74) *Attorney, Agent, or Firm*—Andrus, Sceales, Starke & Sawall, LLP

(57) ABSTRACT

A vertical exhaust water trap assembly has an outer housing and an internal housing or exhaust tube defining an annular water collection spaced therebetween bypassing a central exhaust flow area.

8 Claims, 6 Drawing Sheets

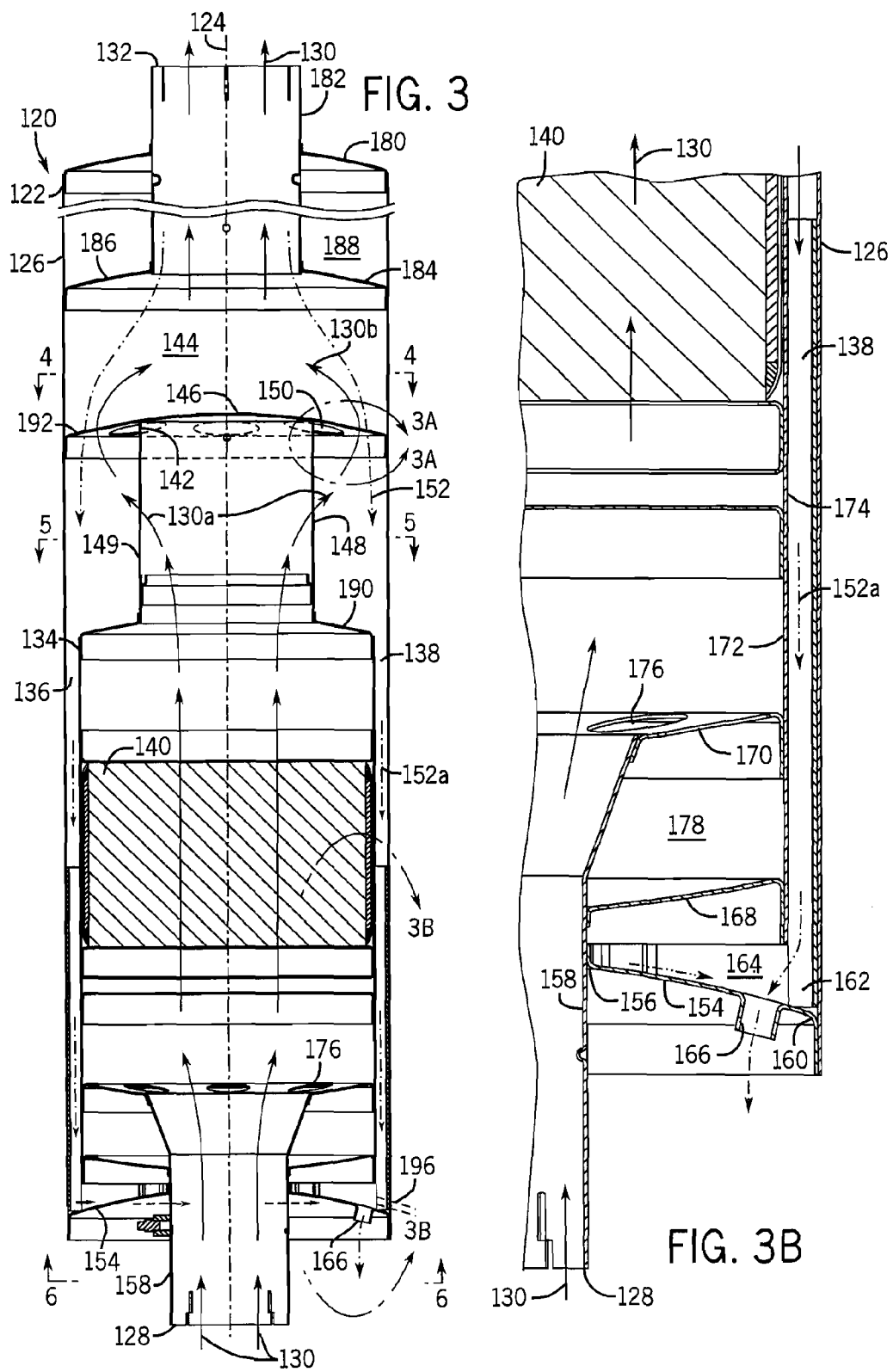

FIG. 3A
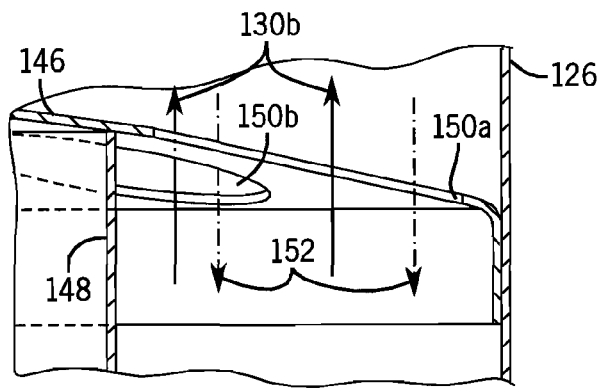
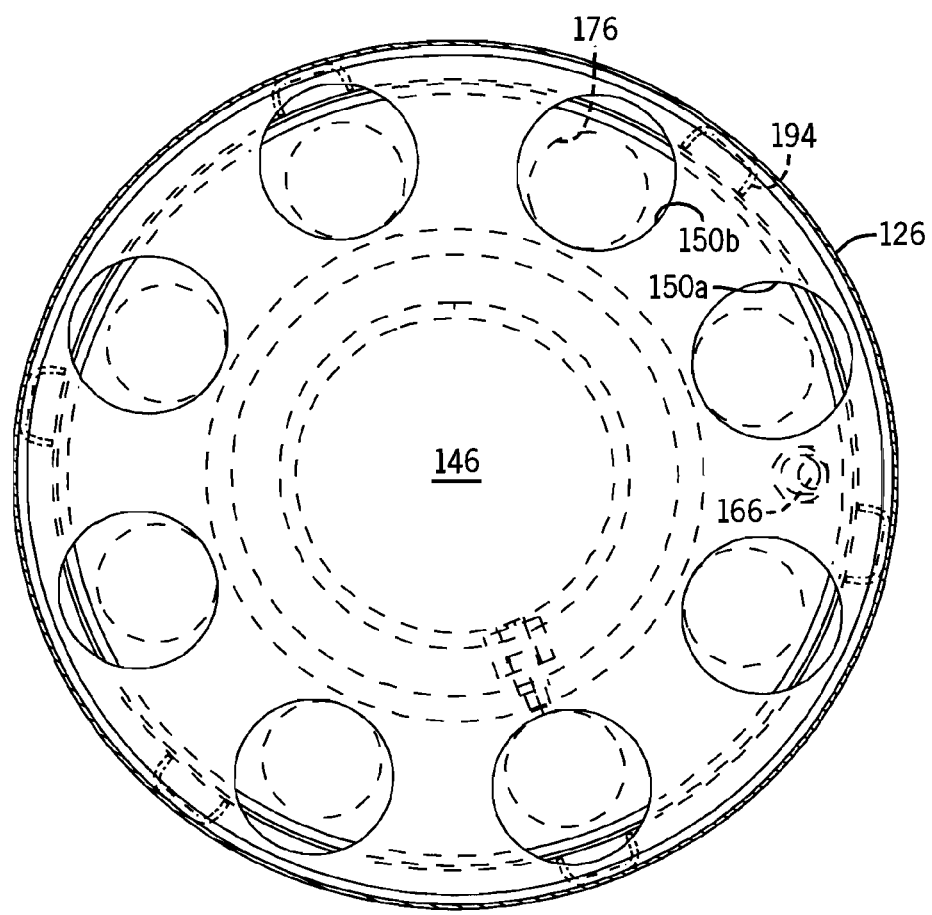
FIG. 4

EXHAUST WATER TRAP

CROSS-REFERENCE TO RELATED APPLICATIONS

This application is a continuation-in-part of U.S. patent application Ser. No. 11/085,715, filed Mar. 21, 2005 now U.S. Pat. No. 7,114,330, which is a continuation of Ser. No. 10/376,424 filed Feb. 28, 2003 U.S. Pat. No. 6,868,670.

BACKGROUND AND SUMMARY

The invention relates to vertical exhaust systems and exhaust water trap assemblies, including for heavy duty vehicles, such as trucks, tractors, off-road equipment, and the like which utilize a vertical exhaust system, for example in which the exhaust conduit extends vertically alongside the cab of the vehicle.

Parent Applications

For reduced emissions, catalytic converters and soot filters have been incorporated in the exhaust system of buses, trucks, and so on. If the exhaust outlet is vertical, there is a possibility that water, such as rain, snow, or bus or truck wash, can enter the upper end of the exhaust system and flow downwardly into contact with the catalytic converter or soot filter unit. The water entering the system can be absorbed in the catalyst/filter mounting mat, e.g. vermiculite, that is typically located between the outer surface of the catalytic converter and the outer body of the exhaust conduit. Mounting mat that is exposed to water results in a much lower push out force, a measure of the ability for the mat to retain the catalyst/filter in place. In another scenario, freezing of water in the catalytic converter can cause structural damage to the monolithic catalyst. As an additional problem, water flowing through the catalytic converter or soot filter may tend to wash particulate material downwardly where such material collects and clogs the lower surface of the catalytic converter/soot filter causing premature failure thereof.

One solution to the above identified problem is shown in U.S. Pat. No. 5,321,215, incorporated herein by reference. As shown in the '215 patent, a perforated tube 15 extends vertically axially within a housing having an outer tubular body 2, and exhaust flows upwardly through tube 15 then radially outwardly through a first set of perforations 19 into an annular chamber 16 then vertically upwardly through such annular chamber and then radially inwardly through a second set of perforations 20 back into tube 15 and then vertically upwardly for discharge. The tube is closed by a plug or closure 21 between the upper and lower sets of perforations 20 and 19. An annular or ring-shaped deflector is mounted on the outer surface of tube 15 and is located immediately beneath plug 21 and intermediate the two groups of perforations 19 and 20. Any moisture flowing downwardly within the upper chamber 25 of tube 15 will flow outwardly through the lowermost perforations of the upper group 20 and be deflected radially outwardly by deflector 26 into the noted annular chamber 16 and be collected in a trap 27 above a lower flange 17, for drainage through a drain opening 28 in outer tubular body 2.

In another known solution to the above identified problem, a plurality of vertically upwardly extending inlet tubes circumferentially surround and axially overlap a downwardly extending central outlet tube, known as the Gatling Gun design. In this design, water entering the system through the outlet tube flows vertically downwardly therealong and does not enter the inlet tubes because the top ends of the inlet tubes are laterally offset from and vertically above the lower end of the central outlet tube.

The parent applications provide another solution to the above identified problem. The parent applications provide a short vertical axial length for easy vehicle packaging, freedom to modify outlet tube size and location, and further provide reduced backpressure and lower production costs. In one aspect of the parent applications, vertical height is shortened by eliminating internal exhaust tube portions. In another aspect, reduced backpressure is provided by eliminating the re-introduction of exhaust into a perforated exhaust tube prior to discharge, for example eliminating re-introduction of exhaust through the upper group of perforations 20 in the above noted '215 patent. In another aspect, backpressure is reduced by separating inlet and outlet exhaust tubes, and providing an open unobstructed plenum therebetween free of an exhaust tube otherwise extending axially therethrough. In another aspect, backpressure is reduced by separating the inlet and outlet exhaust tubes, to enable a larger inlet tube into a plenum providing a larger area for perforations, without limiting the diameter of the inlet tube to that of the outlet tube otherwise dictated by downstream system requirements. In another aspect, backpressure is reduced by eliminating 180° bends in exhaust flow otherwise required between axially overlapped laterally offset inlet and outlet tubes, such as in the above noted Gatling Gun design. In another aspect, the parent applications provide lower production cost by eliminating full circle leak-proof welds around each of a plurality of inlet tubes as in a Gatling Gun design, required to prevent water leakage therepast.

Present Application

The present invention arose during continuing development efforts for improved exhaust water trap assemblies.

In one aspect, it is desired to move the water drainage hole from the side of a vertical muffler to the bottom or inlet end of the muffler. In one embodiment, this is accomplished by routing water past the catalytic converter or soot filter to the inlet side of the muffler where it pools and drains out of a drain hole in an inlet flange. The water is routed past the catalytic converter or soot filter substrate by utilizing a water trap design that incorporates a body inside of a body. The water travels past the substrate between the inner and outer bodies, thus eliminating leak paths that could exist which would allow exhaust gas to bypass the catalyst or particulate filter.

In the past, water and soot draining out of a side drain hole can leave black soot streaks and water marks on the side of the muffler. The water and soot mixture may also corrode brackets and standoffs after time. A solution in the past has been to connect a stainless steel tube and route the tube to the bottom of the muffler. This is difficult for OEMs (original equipment manufacturers) to incorporate into their assembly lines because it is difficult and expensive to route the tubing past brackets, heat shields, and stanchions, while still maintaining an acceptable appearance. By moving the drain hole to the bottom of the muffler, the noted soot streaks along the side of the muffler body are eliminated, and furthermore it is easier for the OEMs to add and route a stainless steel tube to the base of the muffler if there is still concern regarding soot marks on chromed elbows and polished fuel tanks. By moving the drain hole to the inlet end, the interference caused by brackets, heat shields, and stanchions is eliminated or significantly reduced.

In another aspect, the water drainage hole is provided at a vertical level below the vertical level of the catalytic element or particulate soot filter. In this aspect, the water drainage hole may be through the noted lower inlet flange, or may be through the housing sidewall if the latter is unobjectionable.

BRIEF DESCRIPTION OF THE DRAWINGS

Parent Applications

FIG. 1 is a side sectional view of an exhaust water trap assembly in accordance with the noted parent applications.

FIG. 2 is a view of a portion of FIG. 1 and showing an alternate embodiment.

Present Application

FIG. 3 is a side sectional view of an exhaust water trap assembly in accordance with the present invention.

FIG. 3A is an enlarged view taken along line 3A-3A of FIG. 3.

FIG. 3B is an enlarged view taken along line 3B-3B of FIG. 3.

FIG. 4 is a sectional view taken along line 4-4 of FIG. 3.

Figure 5:
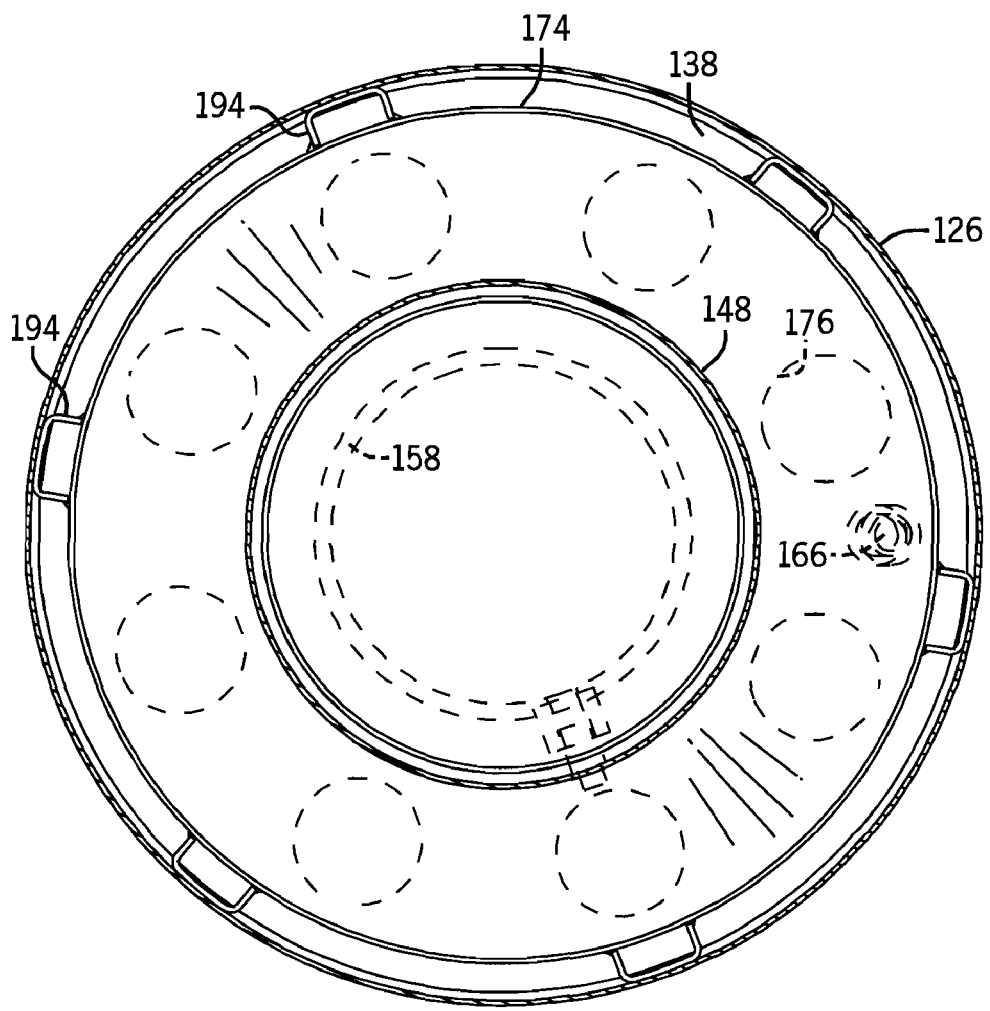

FIG. 5 is a sectional view taken along line 5-5 of FIG. 3.

Figure 6:
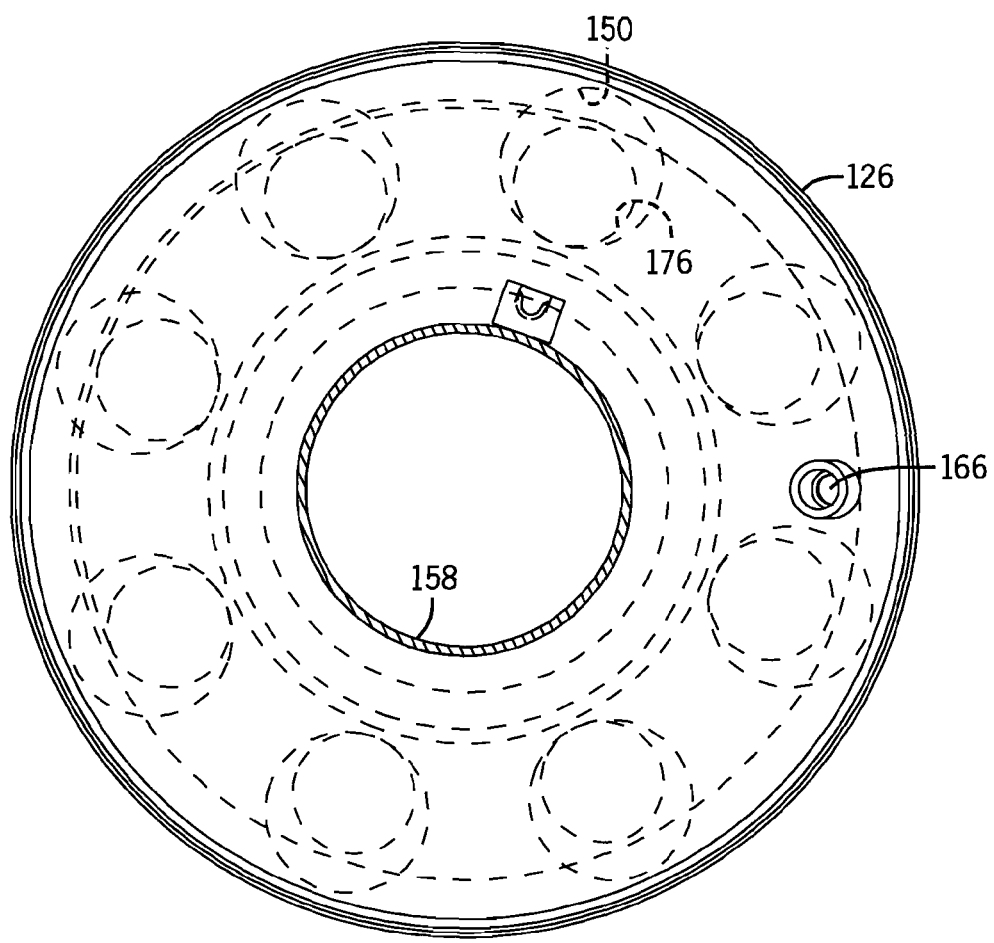

FIG. 6 is a sectional view taken along line 6-6 of FIG. 3.

DETAILED DESCRIPTION

Parent Applications

Figure 1:
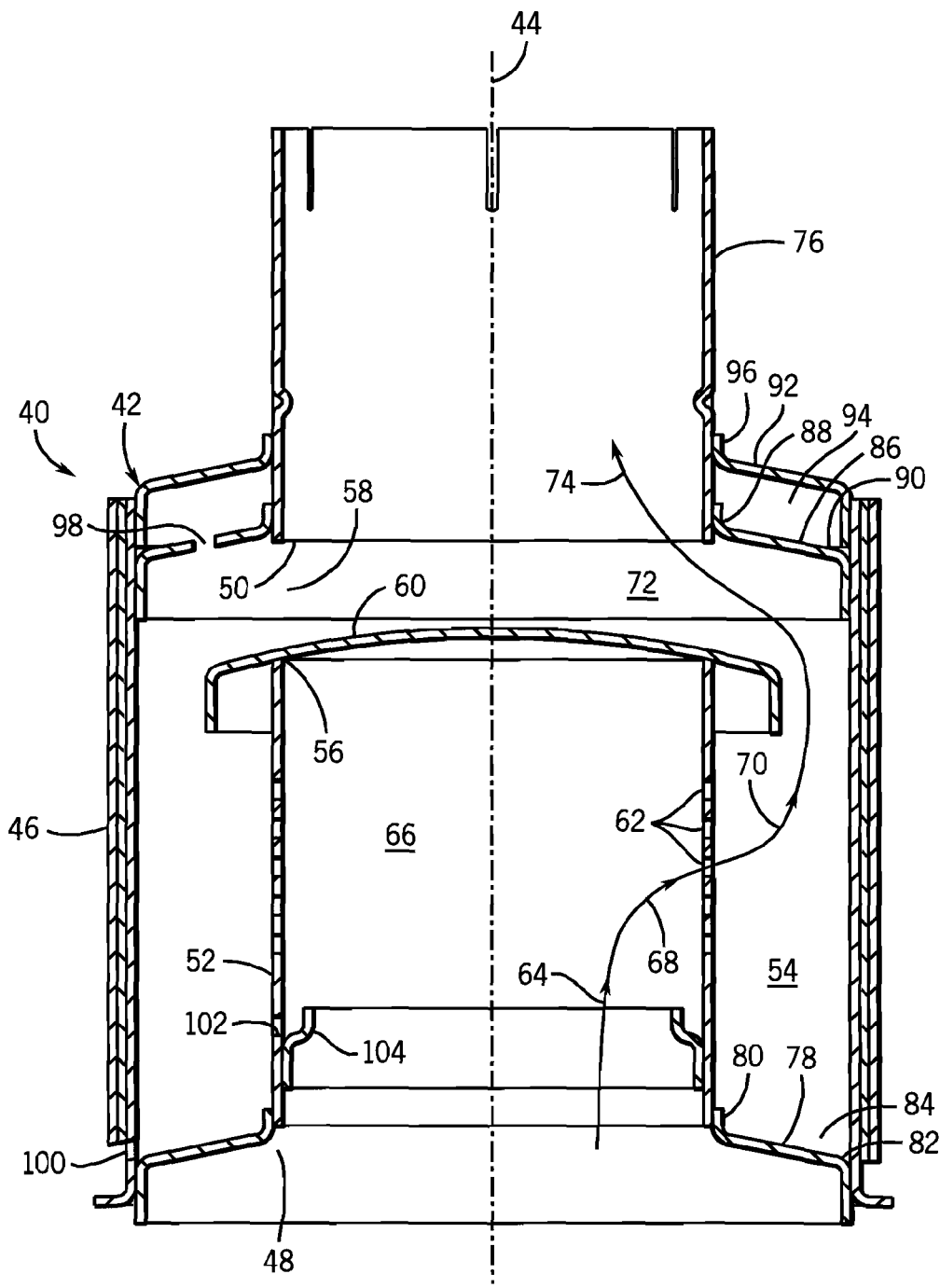
FIGS. 1 and 2 and the following description thereof are taken from the noted parent applications.
Figure 2:
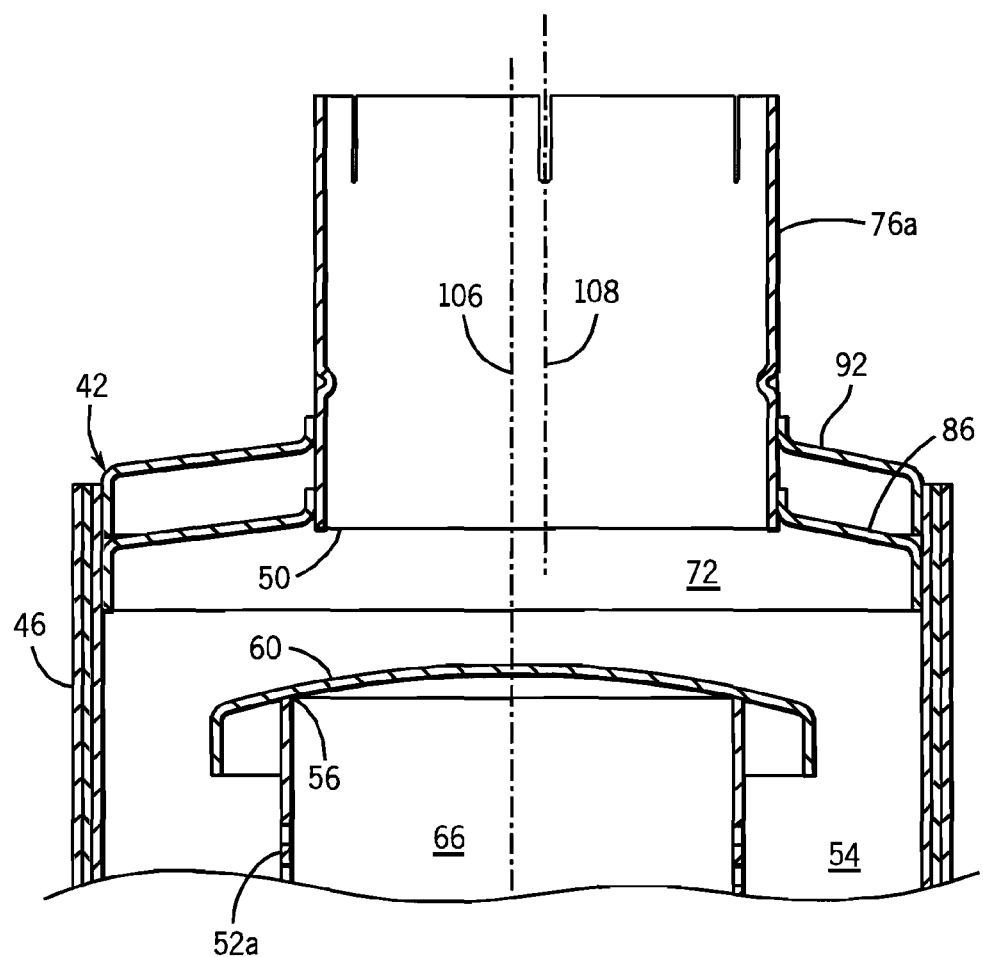

The following description of FIGS. 1 and 2 is taken from the noted parent applications.

FIG. 1 shows an exhaust water trap assembly 40 including a housing 42 extending axially along a vertical axis 44 and having a housing sidewall 46. The housing has a lower inlet 48 for receiving exhaust from an internal combustion engine through a catalytic converter or soot filter, and an upper outlet 50 for discharging the exhaust and which is spaced above lower inlet 48. An internal exhaust tube 52 extends upwardly from lower inlet 48 and is spaced radially inwardly of housing sidewall 46 by a radial gap defining an annular space 54 therebetween. Exhaust tube 52 has a top end 56 vertically spaced below upper outlet 50 by an axial gap 58. A dome cap or umbrella 60 on top end 56 spans internal exhaust tube 52 and blocks exhaust flow axially upwardly therepast, and blocks entry of water axially downwardly therepast into top end 56 of internal exhaust tube 52 from upper outlet 50 and instead diverts and sheds water radially outwardly into annular space 54. Exhaust tube 52 is perforated as shown at perforations 62, and hence exhaust flows axially upwardly as shown at arrow 64 from the internal combustion engine and the catalytic converter into assembly 40 through lower inlet 48 into interior 66 of internal exhaust tube 52, and then flows radially outwardly through perforations 62 as shown at arrow 68 into annular space 54 and then flows axially upwardly as shown at arrow 70 through annular space 54 past dome cap 60 and then into an upper plenum 72 and then to outlet 50 as shown at arrow 74 for discharge vertically axially upwardly through external exhaust tube 76.

A lower annular flange 78 has an inner circumference 80 at internal exhaust tube 52 and defining lower inlet 48, and has an outer circumference 82 at housing sidewall 46 and spanning and closing annular space 54 at a lower end thereof to form a collection space and water trap 84, comparable to water trap 27 in the noted '215 patent. An upper flange 86 has an inner circumference 88 spaced vertically above top end 56 of internal exhaust tube 52 and dome cap 60 by axial gap 58 and defining the noted upper outlet 50, and has an outer circumference 90 at housing sidewall 46. Dome cap 60 and upper flange 86 define upper outlet plenum 72 free of a perforated exhaust tube extending axially therethrough and into which exhaust would otherwise have to be re-introduced and which would otherwise increase restriction, for example, in the '215 patent, eliminating re-introduction of exhaust into exhaust tube 15 through perforations 20. Upper outlet plenum 72 unobstructedly fully occupies the lateral cross-sectional area of housing 42, without an exhaust tube, such as 15 of the '215 patent, extending axially therethrough.

External exhaust tube 76 extends upwardly from upper outlet 50 at upper annular flange 86. In one embodiment, a second upper annular flange 92 is spaced above upper annular flange 86 by an axial gap defining an upper annular space 94 axially between flanges 86 and 94 and radially between external exhaust tube 76 and housing sidewall 46. Each of upper annular flanges 86 and 92 has an inner circumference 88 and 96, respectively, mounted to external exhaust tube 76 at axially spaced locations therealong. This is desirable because it provides reinforcement against lever arm bending of exhaust tube 76 or extensions thereof, typically encountered in mounting of the exhaust system and in service during road and/or engine vibration. In a further embodiment, upper annular flange 86 may have one or more openings such as 98 therethrough communicating with upper annular space 94 to provide a resonant chamber in space 94, for cancellation or damping of designated frequencies or harmonics.

In a desirable aspect, the construction of the present invention separates and spaces first and second tubes 52 and 76, respectively. Second tube 76 is separate from and spaced vertically above first tube 52 by axial gap 58 therebetween defining upper outlet plenum 72 laterally spanning housing 42 above annular space 54 and above top end 56 of first tube 52. Tube 76 extends axially upwardly from the housing for discharging exhaust. Dome cap 60 on top end 56 of tube 52 blocks exhaust flow axially upwardly therepast, such that exhaust flows through the perforated portion of tube 52 as shown at arrow 68 through perforations 62 into annular space 54 then into plenum 72 then to tube 76. Dome cap 60 blocks entry of water axially downwardly therepast into top end 56 of tube 52 from tube 76 thereabove and instead diverts and sheds water radially outwardly into annular space 54. Annular flange 78 extends laterally between first tube 52 and housing sidewall 46 below top end 56 of tube 52 and defines collection space 84 for water shed from dome cap 60 into annular space 54. Flange 78 is preferably at the lower end of tube 52. Housing sidewall 46 has one or more drain holes 100 therethrough above flange 78 for draining water from collection space 84. If moisture collects in space 84 to the level of drain 100, the excess moisture will drain outwardly of sidewall 46.

A portion of the moisture flowing outwardly on dome cap or umbrella 60 may flow inwardly through perforations 62 and along the inner surface of tube 52. This moisture flowing along the inner surface of tube 52 will be directed outwardly through the lowermost row of perforations 102 by a ring 104 secured to the inner surface of tube 52, comparably to ring 22 in the '215 patent. This moisture will then flow along the outer surface of tube 52 and be collected in collection space or trap 84. Most moisture collected in space 84 will drain through hole 100, however when the engine is started, any remaining moisture collected in collection space or trap 84 will be heated and evaporated and the vapor will pass out of the assembly through annular space 54 then upwardly as shown at arrows 70 and 74.

In a desirable aspect, the separation of tubes 52 and 76 (instead of a single tube 15 as in the '215 patent) enables the first tube 52 to have a different diameter than the second tube 76. This is desirable in applications where the second tube 76 is limited or required to be of a certain diameter, e.g. 4", to match system requirements, yet allowing the first tube 52 to be a larger diameter, e.g. 6", to reduce restriction, backpressure, and to improve flow distribution across the catalyst or soot filter. If tubes 52 and 76 are a single unitary tube, then the diameter thereof must match system requirements, including outlet dimensional requirements, which in turn limits the diameter of the internal exhaust tube to a diameter which may unnecessarily introduce restriction or increase backpressure. Different diameter separated tubes 52a and 76a are illustrated in FIG. 2, which uses like reference numerals from above where appropriate to facilitate understanding.

First tube 52 extends along a first axial centerline, and second tube 76 extends along a second axial centerline. In one embodiment, the noted axial centerlines are axially aligned with each other as shown at 44, FIG. 1. In another embodiment, FIG. 2, the axial centerline 106 of first tube 52a is laterally offset from the axial centerline 108 of the second tube 76a. This affords packaging flexibility, which has been particularly encountered in various bus applications where the customer has desired such offset for accommodating restricted compartments in the exhaust system.

Present Application

FIGS. 3-6 show an exhaust water trap assembly 120 including a housing 122 extending axially along a vertical axis 124 and having a housing sidewall 126. The housing has a lower inlet 128 for receiving exhaust as shown at arrows 130 from an internal combustion engine, and an upper outlet 132 for discharging the exhaust and spaced above lower inlet 128. An internal exhaust tube or housing 134 extends upwardly from lower inlet 128 and is spaced radially inwardly of housing sidewall 126 by a radial gap 136 defining an annular space 138 therebetween. Internal exhaust tube or housing 134 houses an exhaust aftertreatment element 140, e.g. a catalyst element and/or particulate soot filter, through which the exhaust flows upwardly. Internal exhaust tube 134 has a top end 142 vertically spaced below upper outlet 132 by an axial gap 144. A dome cap 146 is at the top end 142 of and spans internal exhaust tube 134 and blocks entry of water axially downwardly therepast into top end 142 of internal exhaust tube 134 from upper outlet 132, and instead diverts and sheds the water radially outwardly into annular space 138.

Internal exhaust tube 134 has an upper reduced diameter section 148 which is perforated such that exhaust flows radially outwardly therethrough as shown at arrows 130a. Dome cap 146 has a plurality of openings 150 therearound, for example as shown in FIGS. 4 and 3A at 150a, 150b, etc., through which exhaust flows upwardly as shown at arrows 130b, and through which water flows downwardly as shown at arrows 152. The water flows downwardly as shown at arrows 152a into annular space 138, FIGS. 3, 3B.

A lower flange 154, FIGS. 3, 3B, has an inner circumference 156 at a lower section 158 of internal exhaust tube 134 and defines the noted lower inlet 128. Flange 154 has an outer circumference 160 at outer housing sidewall 126 and spans and closes annular space 138 at a lower end 162 thereof to form a collection space 164 for the water. One or more drain holes 166 are provided through lower flange 154 for draining water from collection space 164. Flanges 168 and 170 are spaced above flange 154 and extend between lower inlet section 158 of the internal exhaust tube and sidewall 172 of central section 174 of the internal exhaust tube. Flange 170 has one or more openings 176 therethrough communicating with the space 178 between flanges 168 and 170 to provide a resonant chamber in space 178, for cancellation or damping of designated frequencies or harmonics. Water collection space 164 is sealed from resonant chamber 178 by flange 168 therebetween.

An upper annular flange 180, FIG. 3, has an inner circumference at upper outlet tube 182 spaced vertically above top end 142 of internal exhaust tube 134 and dome cap 146 by the noted axial gap 144 and defining the noted upper outlet 132. Flange 180 has an outer circumference at outer housing sidewall 126. Another flange 184 also extends between outlet tube 182 and housing sidewall 126 and is spaced below flange 180. Flange 184 has one or more openings such as 186 therethrough communicating with annular space 188 between flanges 180 and 184 to provide a resonant chamber in space 188, for cancellation or damping of designated frequencies or harmonics. Dome cap 146 and the upper flanges define an upper outlet plenum 144 free of a perforated exhaust tube extending axially therethrough and into which exhaust would otherwise would have to be re-introduced and which would otherwise increase restriction. Upper outlet plenum 144 fully occupies the entire lateral cross-sectional area of the housing without an exhaust tube extending axially therethrough.

Internal exhaust tube 134 has the noted lower section 158 of a first outer circumference and extending axially through lower flange 154 at the latter's inner circumference 156. Internal exhaust tube 134 has the noted middle section 174 of a second outer circumference and extending axially upwardly from lower section 158 and defining at least in part the noted annular space 138 between outer housing sidewall 126 and the noted second outer circumference of middle section 174 at sidewall 172 of internal exhaust tube 134. Internal exhaust tube 134 has the noted upper section 148 of a third outer circumference and extending axially upwardly from middle section 174 and is perforated as shown at 149 to pass exhaust radially outwardly therethrough as shown at arrows 130a. The noted second outer circumference of middle section 174 is greater than each of the noted first and third outer circumferences of lower section 158 and upper section 148, respectively. An intermediate annular flange 190, FIG. 3, is axially spaced between upper and lower flanges 180 and 154 and is axially spaced below dome cap 146. Intermediate flange 190 is formed on internal exhaust tube 134 and transitions between the noted second and third outer circumferences and further diverts water into annular space 138. The noted one or more drain holes 166 are through lower flange 154 at lower inlet 128 and drain water from annular space 138 and collection space 164. Intermediate flange 190 has an inner circumference coextensive with the noted third outer circumference of upper section 148. Intermediate flange 190 has an outer circumference coextensive with the noted second outer circumference of middle section 174. Dome cap 146 has an outer circumference 192 greater than the noted third outer circumference at upper section 148 of internal exhaust tube 134. Outer circumference 192 of dome cap 146 is greater than or equal to the noted second outer circumference of middle section 174. Preferably, outer circumference 192 of dome cap 146 is at outer housing sidewall 126, and dome cap 146 has the noted plurality of openings 150 extending axially therethrough and radially spaced between the noted third outer circumference at upper section 148 of internal exhaust tube 134 and outer circumference 192 of dome cap 146. Openings 150 pass exhaust upwardly therethrough and pass water downwardly therethrough, as above noted for example at arrows 130b and 152, respectively.

Housing 122 provides a first external housing extending axially along vertical axis 124 and having the noted first housing sidewall 126. Internal exhaust tube 134 provides a second housing within the first housing 122 and concentrically surrounded thereby and extending axially along vertical axis 124. Second internal housing 134 has a housing sidewall 172 spaced radially inwardly of first housing sidewall 126 by the noted radial gap 136 defining the noted annular space 138 therebetween. Second internal housing 134 has the noted lower inlet 128 for receiving exhaust from an internal combustion engine. First outer housing 122 has the noted upper outlet 132 for discharging the exhaust and is spaced above lower inlet 128. The second inner housing includes the noted internal exhaust tube having the noted lower section 158 extending upwardly from lower inlet 128, the noted middle section 174 extending upwardly from lower section 158 and defining at least in part the noted annular space 138, and the noted upper section 148 extending upwardly from middle section 174 and having the noted top end 142 spaced below upper outlet 132 by the noted axial gap 144. Dome cap 146 is provided at the noted top end 142 of and spans upper section 148 of the internal exhaust tube and blocks entry of water axially downwardly therepast into top end 142 of the internal exhaust tube from upper outlet 132 and instead diverts and sheds the water radially outwardly and then through holes 150 into annular space 138. The internal exhaust tube or housing 134 is mounted within outer housing 122 by a plurality of radial spokes or legs 194, FIG. 5, which also maintain the radial gap spacing at 136 to provide annular space 138.

As noted above, exhaust aftertreatment element 140 is housed in second housing 134. The one or more drain holes 166 are at a vertical level below the vertical level of exhaust aftertreatment element 140. As shown in FIG. 3, the one or more drain holes 166 are vertically spaced below exhaust aftertreatment element 140 by a vertical gap therebetween. The one or more drain holes 166 may be provided through lower flange 154, as noted above. Alternatively or additionally, one or more drain holes may be provided through housing sidewall 126, as shown in dashed line at 196. Drain holes 166 may be vertically aligned with exhaust aftertreatment element 140 as shown, and/or may be radially offset therefrom, for example by being vertically aligned with annular space 138. Drain holes 196 are vertically spaced below and radially offset from exhaust aftertreatment element 140.

The above noted inner and outer circumferences of annular space 138 provided by the respective housing sidewalls, and the noted inner and outer circumferences of the respective flanges, may have various shapes including cylindrical shapes, oval shapes, racetrack shapes, and other closed loop configurations. The term annular herein includes such shapes, and the terms inner and outer circumferences include the concording perimeter shapes thereof. Furthermore, respective inner and outer circumferences may or may not have identical shapes, for example an inner circumference may be round while the outer circumference is oval, and vice versa, etc. The inner and outer circumferences may share the same coincident vertical axis, or may have radially or laterally offset axes. The inlet and outlet may share the same coincident vertical axis, or may have different axes, as well as inner and outer circumferences of differing shape and/or alignment. The inlet and outlet may extend vertically parallel to vertical axis 124 as shown, or alternatively may extend radially or laterally through a respective housing sidewall, or may extend at some other angle relative to vertical.

It is recognized that various equivalents, alternatives and modifications are possible within the scope of the appended claims.

What is claimed is:

1. An exhaust water trap assembly comprising a housing extending axially along a vertical axis and having a housing sidewall, said housing having a lower inlet for receiving exhaust from an internal combustion engine, and an upper outlet for discharging said exhaust and spaced above said lower inlet, an internal exhaust tube extending upwardly from said lower inlet and spaced radially inwardly of said housing sidewall by a radial gap defining an annular space therebetween, said internal exhaust tube having a top end vertically spaced below said upper outlet by an axial gap, a dome cap at said top end of and spanning said internal exhaust tube and blocking entry of water axially downwardly therepast into said top end of said internal exhaust tube from said upper outlet and instead diverting and shedding said water radially outwardly into said annular space, a lower annular flange having an inner circumference at said internal exhaust tube and defining said lower inlet, and having an outer circumference at said housing sidewall and spanning and closing said annular space to form a collection space for said water, an upper annular flange spaced above said dome cap and providing said upper outlet, said internal exhaust tube having a lower section of a first outer circumference and extending axially through said lower flange at said inner circumference of said lower flange, said internal exhaust tube having a middle section of a second outer circumference and extending axially upwardly from said lower section and defining at least in part said annular space between said housing sidewall and said second outer circumference, said internal exhaust tube having an upper section of a third outer circumference and extending axially upwardly from said middle section and being perforated to pass exhaust radially outwardly therethrough, said second outer circumference being greater than each of said first and third outer circumferences, and one or more drain holes for draining water from said collection space, and comprising an intermediate annular flange axially spaced between said upper and lower annular flanges and axially spaced below said dome cap, said intermediate flange being formed on said internal exhaust tube and transitioning between said second and third outer circumferences and further diverting water into said annular space.

2. The exhaust water trap assembly according to claim 1 wherein said drain holes are at said lower inlet.

3. The exhaust water trap assembly according to claim 1 wherein said drain holes are through said lower annular flange.

4. The exhaust water trap assembly according to claim 1 wherein said intermediate annular flange has an inner circumference coextensive with said third outer circumference, and said intermediate flange has an outer circumference coextensive with said second outer circumference.

5. The exhaust water trap assembly according to claim 1 wherein said dome cap has an outer circumference greater than said third outer circumference.

6. The exhaust water trap assembly according to claim 5 wherein said outer circumference of said dome cap is greater than or equal to said second outer circumference.

7. The exhaust water trap assembly according to claim 6 wherein said outer circumference of said dome cap is at said housing sidewall, and wherein said dome cap has a plurality of openings extending axially therethrough and radially spaced between said third outer circumference of said internal exhaust tube and said outer circumference of said dome cap, said openings passing exhaust upwardly therethrough and passing water downwardly therethrough.

8. An exhaust water trap assembly comprising a first housing extending axially along a vertical axis and having a first housing sidewall, a second housing within said first housing and concentrically surrounded thereby and extending axially along said vertical axis and having a second housing sidewall spaced radially inwardly of said first housing sidewall by a radial gap defining an annular space therebetween, said second housing having a lower inlet for receiving exhaust front an internal combustion engine, said first housing having an upper outlet for discharging said exhaust and spaced above said lower inlet, said second housing having an internal exhaust tube having a lower section extending upwardly from said lower inlet, a middle section extending upwardly from said lower section and defining at least in part said annular space, and an upper section extending upwardly from said middle section and having a top end spaced below said upper outlet by an axial gap, a dome cap at said top end of and spanning said upper section of said internal exhaust tube of said second housing and blocking entry of water axially downwardly therepast into said top end of said internal exhaust tube from said upper outlet and instead diverting and shedding said water radially outwardly into said annular space, and one or more drain holes draining water from said annular space, a lower flange having an outer circumference at said first housing and an inner circumference at said second housing and spanning and closing said annular space to form a collection space for said water, wherein said one or more drain holes are through said lower flange, said internal exhaust tube of said second housing has a lower section of a first outer circumference and extending axially through said lower flange at said inner circumference of said lower flange, said internal exhaust tube of said second housing has a middle section of a second outer circumference and extending axially upwardly from said lower section and defining at least in part said annular space between said first and second housings, said internal exhaust tube of said second housing has an upper section of a third outer circumference and extending axially upwardly from said middle section and is perforated to pass exhaust radially outwardly therethrough, said second outer circumference being greater than each of said first and third outer circumferences, and comprising an intermediate annular flange axially spaced between said lower annular flange and said dome cap, said intermediate flange being formed on said internal exhaust tube of said second housing and transitioning between said second and third outer circumferences and further diverting water into said annular space, wherein said dome cap has an outer circumference at said first housing sidewall, and wherein said dome cap has a plurality of openings extending axially therethrough and radially spaced between said third outer circumference of said internal exhaust tube of said second housing and said first housing sidewall of said first housing, said openings passing exhaust upwardly therethrough and passing water downwardly therethrough.

* * * * *